US008427396B1

(12) United States Patent
Kim

(10) Patent No.: US 8,427,396 B1
(45) Date of Patent: Apr. 23, 2013

(54) HEAD MOUNTED DISPLAY AND METHOD OF OUTPUTTING A CONTENT USING THE SAME IN WHICH THE SAME IDENTICAL CONTENT IS DISPLAYED

(75) Inventor: Yongsin Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/587,527

(22) Filed: Aug. 16, 2012

(30) Foreign Application Priority Data

Jul. 16, 2012 (KR) .................. 10-2012-0077352

(51) Int. Cl.
*G09G 5/00* (2006.01)
(52) U.S. Cl.
USPC ............................................................ 345/8
(58) Field of Classification Search ................. 345/8
See application file for complete search history.

(56) References Cited

U.S. PATENT DOCUMENTS

| | | | |
|---|---|---|---|
| 7,188,139 B1 | 3/2007 | Ayatsuka et al. | |
| 2006/0082542 A1* | 4/2006 | Morita et al. | 345/156 |
| 2007/0233759 A1 | 10/2007 | Tomlinson et al. | |
| 2012/0075167 A1* | 3/2012 | Lahcanski et al. | 345/8 |
| 2012/0127284 A1* | 5/2012 | Bar-Zeev et al. | 348/53 |
| 2012/0146894 A1* | 6/2012 | Yang et al. | 345/156 |
| 2012/0242560 A1* | 9/2012 | Nakada et al. | 345/8 |

FOREIGN PATENT DOCUMENTS

| | | |
|---|---|---|
| JP | 7-67056 A | 3/1995 |
| JP | 2000-347596 A | 12/2000 |
| JP | 2011-166631 A | 8/2011 |
| JP | 2012-78224 A | 4/2012 |

* cited by examiner

*Primary Examiner* — Adam J Snyder
(74) *Attorney, Agent, or Firm* — Birch, Stewart, Kolasch & Birch, LLP

(57) ABSTRACT

The present invention relates to a method of outputting a content using a head mounted display (HMD), and more particularly, to a method of outputting a currently displayed content of a digital device to an HMD. The present invention includes performing a pairing with a digital device having at least one display unit configured to display the content, detecting a location state of the paired digital device, and outputting the content displayed on the digital device to the HMD, wherein the location state comprises a first state in which a display unit of the digital device is located within a preset view angle region of the HMD and a second state in which the display unit of the digital device is not located within the view angle region.

24 Claims, 13 Drawing Sheets

FIG. 9
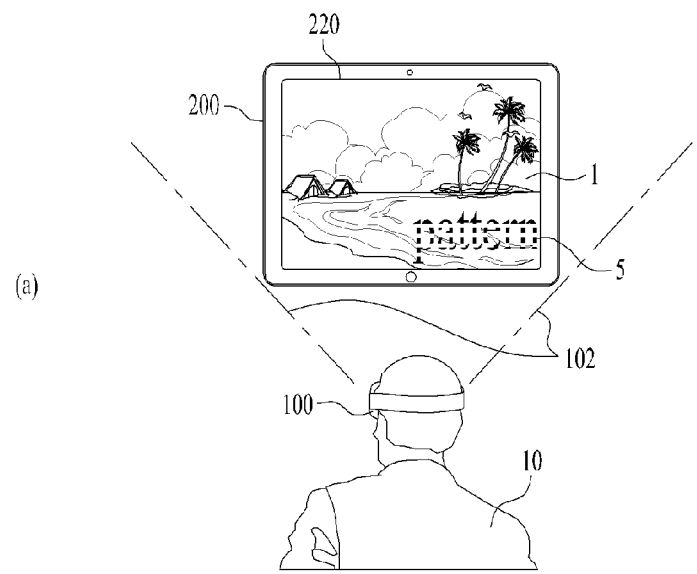
(a)
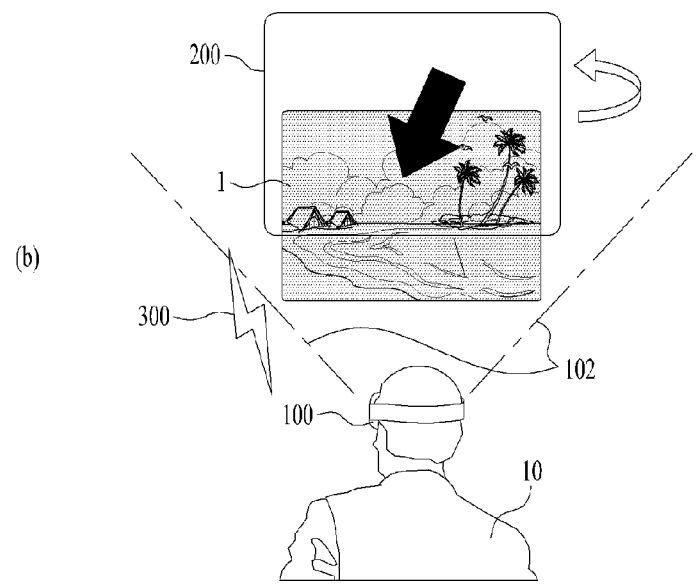
(b)

FIG. 10
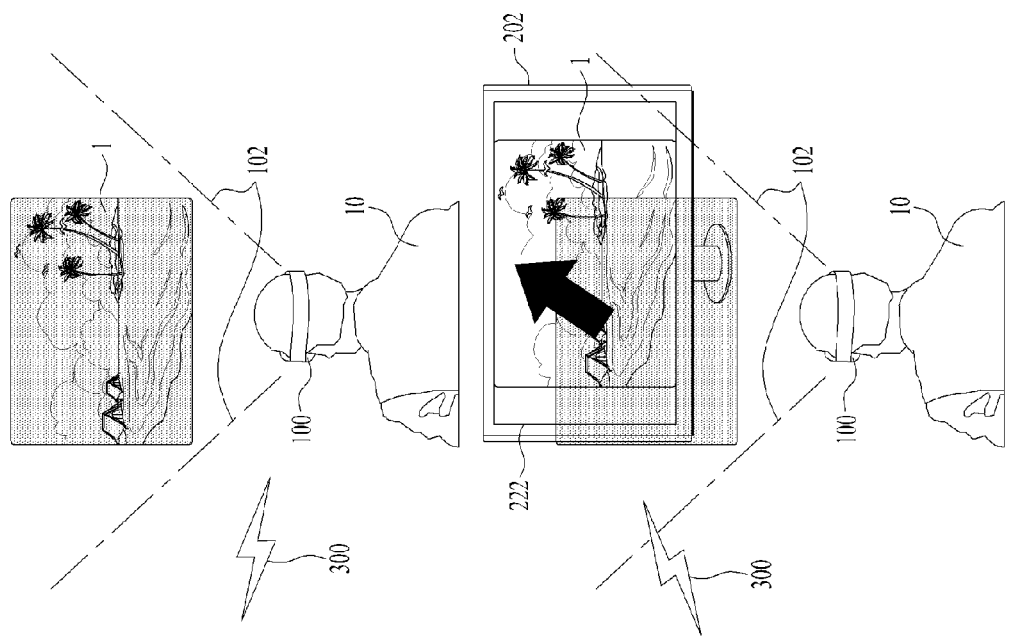
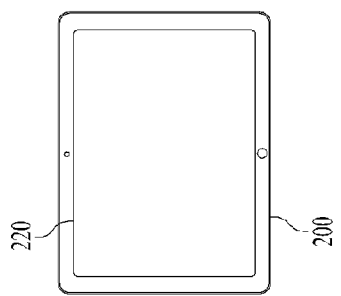
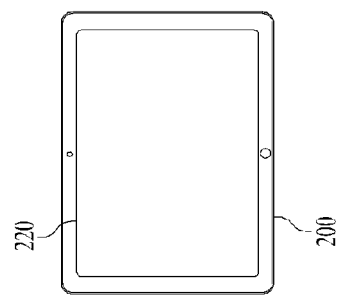

HEAD MOUNTED DISPLAY AND METHOD OF OUTPUTTING A CONTENT USING THE SAME IN WHICH THE SAME IDENTICAL CONTENT IS DISPLAYED

This application claims the benefit of the Korean Patent Application No. 10-2012-0077352, filed on Jul. 16, 2012, which is hereby incorporated by reference as if fully set forth herein.

BACKGROUND OF THE INVENTION

1. Field of the Invention

The present invention relates to a method of outputting a content using a head mounted display (HMD), and more particularly, to a method of outputting a currently displayed content of a digital device to an HMD.

2. Discussion of the Related Art

A head mounted display (hereinafter abbreviated HMD) means a sort of an image display device wearable on a head like glasses to enable an image to be viewed. As a digital device tends to have its lightness in weight and its compactness, various kinds of wearable computers are being developed and the HMD is being widely used. The HMD is combined with such a technology as an augmented reality technology, an N-screen technology and the like over a simple display function, thereby providing a user with a variety of convenience.

The HMD is usable by being linked with various kinds of digital devices. The HMD is linked with a digital device via network to output a content of the corresponding digital device. And, the HMD receives a user input for the digital device or is able to perform a job interoperable with the corresponding digital device.

SUMMARY OF THE INVENTION

Accordingly, the present invention is directed to a head mounted display and method of outputting a content using the same that substantially obviate one or more of the problems due to limitations and disadvantages of the related art.

An object of the present invention is to provide a head mounted display and method of outputting a content using the same, by which a user can be provided with an optimal-state content displayed on a display device interoperating with a head mounted display (HMD).

In particular, one object of the present invention is to provide a method of displaying a content appropriately in accordance with a use status of a user wearing a head mounted display (HMD), e.g., eyes of the HMD wearing user.

Another object of the present invention is to provide a head mounted display and method of outputting a content using the same, by which a user can be provided with convenience in a manner that a content output switching between a head mounted display (HMD) and a digital device interoperating with the head mounted display is automatically performed without a manual input performed by the user.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of outputting a content using an HMD (head mounted display) according to one embodiment of the present invention may include the steps of performing a pairing with a digital device having at least one display unit configured to display the content, detecting a location state of the paired digital device, and outputting the content currently displayed on the digital device to the HMD, wherein the location state includes a first state in which a display unit of the digital device is located within a preset view angle region of the HMD and a second state in which the display unit of the digital device is not located within the view angle region.

To further achieve these and other advantages and in accordance with the purpose of the present invention, a method of outputting a content using an HMD (head mounted display) according to another embodiment of the present invention may include the steps of detecting at least one marker located within a preset view angle region of the HMD, the at least one marker comprising an identifier indicating content information, detecting a location state of the marker, the location state including a first state in which the marker is located within the preset view angle region of the HMD and a second state in which the marker is not located within the preset view angle region, if the location state of the marker is switched into the second state from the first state, receiving the content corresponding to the marker from a server, and outputting the received content to the HMD, wherein if the location state of the marker is switched into the first state from the second state, the outputting step includes the step of terminating an output of the content.

To further achieve these and other advantages and in accordance with the purpose of the present invention, an HMD (head mounted display) according to another embodiment of the present invention may include a processor controlling an operation of the HMD, a display unit outputting an image based on a command given by the processor, and a communication unit transceiving data with at least one digital device based on the command given by the processor, wherein the processor performs a pairing with a digital device having at least one display unit configured to display the content, wherein the processor detects a location state of the paired digital device, wherein the processor outputs the content currently displayed on the digital device to the display unit of the HMD based on the detected location state, and wherein the location state includes a first state in which the display unit of the digital device is located within a preset view angle region of the HMD and a second state in which the display unit of the digital device is not located within the view angle region.

To further achieve these and other advantages and in accordance with the purpose of the present invention, an HMD (head mounted display) according to a further embodiment of the present invention may include a processor controlling an operation of the HMD, a display unit outputting an image based on a command given by the processor, and a communication unit transceiving data with at least one digital device based on the command given by the processor, wherein the processor detects at least one marker located within a preset view angle region of the HMD, wherein the at least one marker includes an identifier indicating content information, wherein the processor detects a location state of the marker, wherein the location state includes a first state in which the marker is located within the preset view angle region of the HMD and a second state in which the marker is not located within the preset view angle region, wherein if the location state of the marker is switched into the second state from the first state, the processor receives the content corresponding to the marker from a server, wherein the processor outputs the received content to the HMD, and wherein if the location state of the marker is switched into the first state from the second state, the processor terminates an output of the content.

It is to be understood that both the foregoing general description and the following detailed description are exemplary and explanatory and are intended to provide further explanation of the invention as claimed.

Accordingly, the present invention provides the following effects or advantages.

First of all, the present invention enables a content, which is displayed on a display device currently interoperating with an HMD, to move seamlessly into the HMD in accordance with a use environment of a user, thereby providing the user with convenience.

In particular, if eyes of a user, who wears an HMD, do not face a digital device interoperating with the HMD, a content currently displayed on the corresponding digital device is automatically displayed on the HMD, whereby the user can be provided with the content on the HMD.

Secondly, if eyes of a user, who wears an HMD, face a digital device interoperating with the HMD, the HMD does not perform a content display, whereby the user can be exactly provided with the content of the digital device without interference via a display of the HMD.

Thirdly, according to the present invention, since a triggering for determining whether a content currently displayed on a digital device will be outputted to an HMD is automatically switched based on eyes of a user, the user can be persistently provided with the content of the digital device without performing a separate user input.

Finally, according to another embodiment of the present invention, when user's eyes through an HMD face another external device having a display unit, the corresponding external device is enabled to output a content, whereby the user can be provided with the content through various resources capable of displaying contents.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8 to 10 are diagrams for another detailed examples of outputting a content using an HMD of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Figure 1:
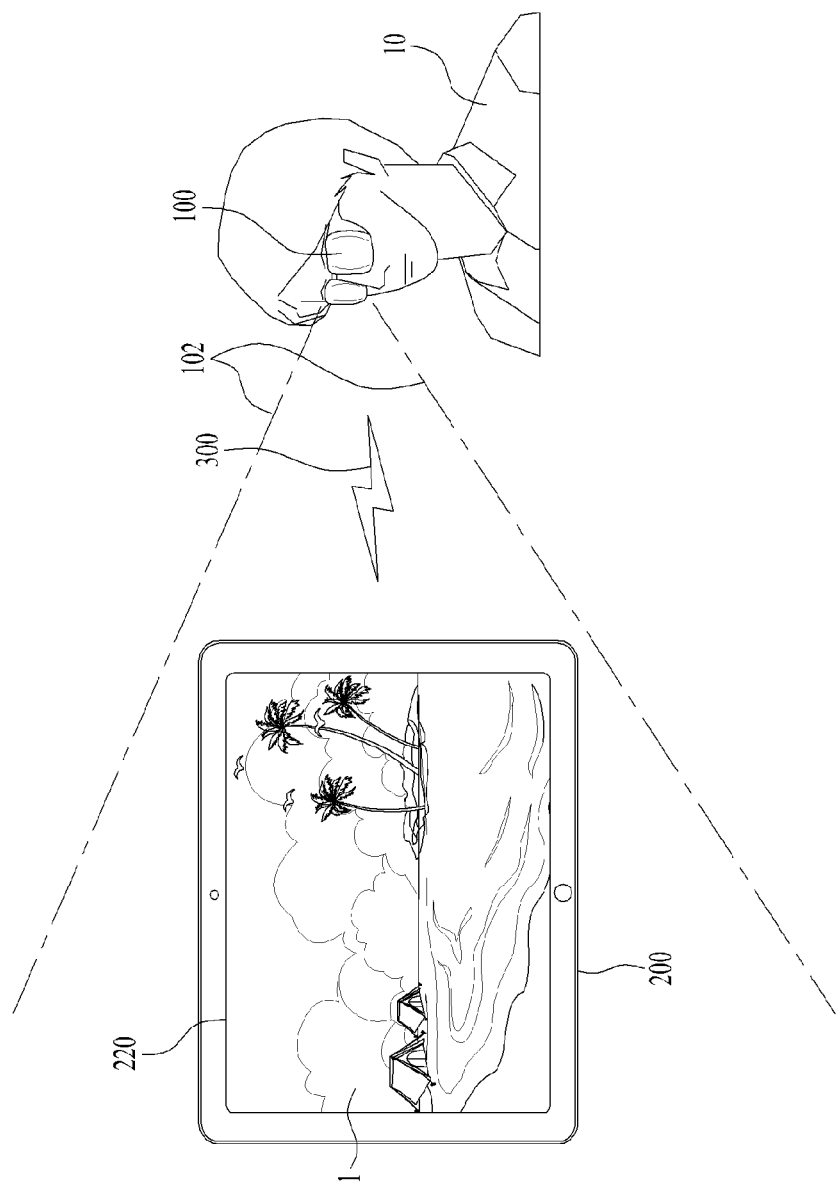
FIG. 1 is a diagram of an HMD according to an embodiment to the present invention, a user wearing the HMD, and a digital device interoperating with the HMD.

FIG. 1 shows an HMD 100 according to an embodiment to the present invention, a user 10 wearing the HMD, and a digital device 200 interoperating with the HMD 100.

Referring to FIG. 1, the digital device 200 may be able to output various kinds of contents 1. For instance, the digital device 200 may be able to output various kinds of multimedia contents including a live broadcast, a movie, a music, a drama, a webpage, a game, and application and the like. The digital device 200 includes at least one display unit 220. The content 1 outputted from the digital device 200 may be displayed on the display unit 220. Meanwhile, the digital device 200 may include a communication unit (not shown in the drawing). And, data can be transceived between the HMD 100 and other external devices via the communication unit. According to the present invention, the digital device 200 may include various kinds of electronic devices each of which includes a display unit and a communication unit. For instance, the digital device 200 may include such a device, which is capable of image display and data communication, as a PC, a PDA (personal digital assistant), a notebook computer, a tablet PC, a television and the like.

The HMD 100 may be configured to work by interoperating with the digital device 200. For the interoperation between the HMD 100 and the digital device 200, a separate pairing or communication connection may be performed. This paring or communication connecting job may be performed in response to a user input performed on the HMD 100 or the digital device 200. For instance, the HMD 100 may be able to provide a separate button or user interface for the pairing or communication connection with the digital device 200. Hence, a user may be able to attempt the paring or communication connection between the HMD 100 and the digital device 200 via a user input using the button or user interface.

The HMD 100 is capable of image display using the included display unit. For instance, the HMD 100 may be able to display a user interface of its own, a response to a user input and the like. And, the HMD 100 may be able to display various kinds of contents by interoperating with the digital device 200 connected by a network 300. According to the embodiment of the present invention, the HMD 100 may be able to have a view angle region 102 in a preset range. This view angle region 102 is a preset region corresponding to a view of the user wearing the HMD 100 and may include a section covering a predetermined angle range in front direction of the HMD 100.

According to the embodiment of the present invention, the HMD 100 may be able to detect whether the digital device 200 interoperating with the HMD 100 is located in the view angle region 102 of the HMD 100. In particular, the HMD 100 may be able to detect a location state of the interoperating digital device 200. In the present invention, the location state may include a first state having the display unit 220 of the digital device 200 located in the view angle region 102 of the HMD 100 and a second state having the display unit 220 of the digital device 200 located outside the view angle region 102 of the HMD 100.

Meanwhile, the network 300 of the present invention may include wire/wireless networks that enable communications between the HMD 100 and the digital device 200. In particular, available wireless networks may include NFC (near field communication), Zigbee, Infrared communication, Bluetooth, Wi-Fi and the like, by which the present invention may be non-limited. According to the present invention, communications between the HMD 100 and the digital device 200 may be performed using one of the above-enumerated networks 300 or a combination thereof.

Figure 2:
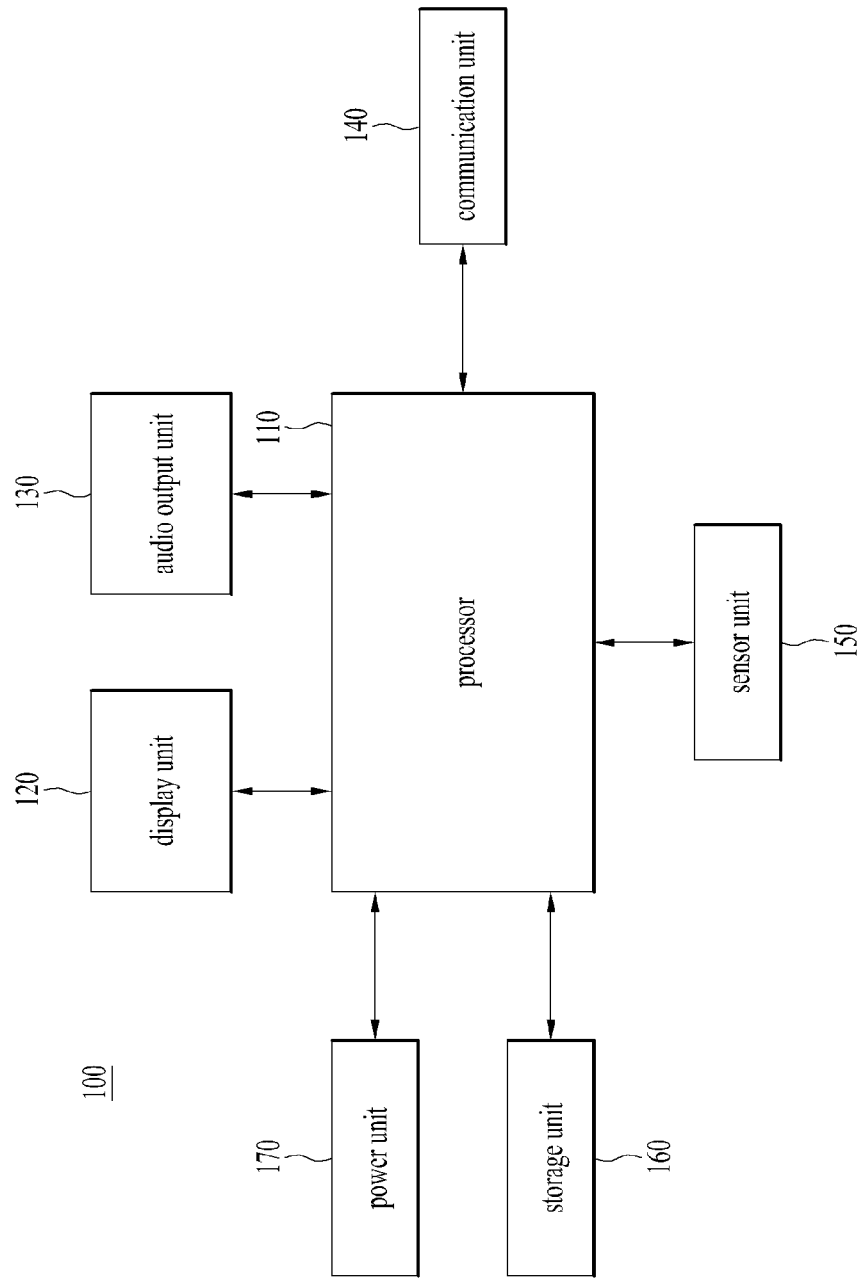
FIG. 2 is a block diagram of an HMD according to an embodiment of the present invention.

FIG. 2 is a block diagram of an HMD according to an embodiment of the present invention.

Referring to FIG. 2, an HMD 100 according to the present invention may include a processor 110, a display unit 120, an audio output unit 130, a communication unit 140, a sensor unit 150, a storage unit 160 and a power unit 180.

First of all, the display unit 120 outputs an image to a display screen. In particular, the display unit 120 may be able to output an image based on a content executed in the processor 110 or a control command given by the processor 110. According to an embodiment of the present invention, the display unit 120 may be able to display an image based on a control command given by an external device (e.g., a digital device) interoperating with the HMD 100. For instance, the display unit 120 may be able to display a content currently executed by the digital device interoperating with the HMD 100. In doing so, the HMD 100 receives data from the digital device via the communication unit 140 and may be then able to output a corresponding image based on the received data.

The audio output unit 130 may include such an audio output means as a speaker, an earphone and the like. The audio output unit 130 may be able to output audio based on a content executed in the processor 110 or a control command given by the processor 110 as well. According to the embodiment of the present invention, the audio output unit 130 may be able to output audio based on a control command given by the digital device interoperating with the HMD 100. For instance, the audio output unit 130 may be able to output audio based on a content currently executed by the digital device interoperating with the HMD 100. According to the present invention, the audio output unit 130 may be optionally provided to the HMD 100.

The communication unit 140 may be able to transmit and receive data by performing communications with an external device by various protocols. The communication unit 140 accesses a network by wire/wireless and may be then able to transmit and receive digital data such as contents and the like. According to the present invention, the HMD 100 may be able to perform a pairing and communication connection with a digital device using the communication unit 140 and may be then able to transceive data with the connected digital device. Meanwhile, according to one embodiment of the present invention, the communication unit 140 may be able to include a plurality of antennas. Using a plurality of the antennas, the HMD 100 may be able to detect a location state of a digital device communication-connected with the HMD 100. In particular, using time differences, phase differences and the like of the signals transceived via a plurality of the antennas provided to the HMD 100, the HMD 100 may be able to detect whether a display unit of the digital device connected with the HMD 100 is located in a view angle region of the HMD 100.

The sensor unit 150 may be able to forward a user input or an environment recognized by the HMD 100 to the processor 110 using a plurality of sensors installed in the HMD 100. In this case, the sensor unit 150 may be able to include a plurality of sensing means. For example, a plurality of the sensing means may include a gravity sensor, a geomagnetic sensor, a motion sensor, a gyro sensor, an acceleration sensor, an infrared sensor, an inclination sensor, a brightness sensor, an altitude sensor, an olfactory sensor, a temperature sensor, a depth sensor, a pressure sensor, a bending sensor, an audio sensor, a video sensor, a GPS (global positioning system) sensor, a touch sensor and the like. The sensor unit 150 is a common name of one of the various sensing means mentioned in the above description. The sensor unit 150 senses valorous inputs and user's environment and may be then able to forward a sensing result to the processor 100 to perform a corresponding action or operation. The above-mentioned sensors may be included as separate elements in the HMD 100 or may be included in a manner of being integrated into at least one element.

According to another embodiment of the present invention, the sensor unit 150 may include an image photographing sensor (not shown in the drawing). The image photographing sensor detects an image within a preset view angle image and may be then able to provide the detected image to the processor 110. According to one embodiment of the present invention, based on the image detected via the image photographing sensor, the processor 110 may be able to detect whether a digital device (or, a display unit of the corresponding digital device) interoperating with the HMD 100 is present within the view angle region of the HMD 100. In this case, the image photographing sensor may be substituted with an infrared sensor or the like for the purpose of the present invention.

The storage unit 160 of the present invention may be able to store various digital data including video, audio, photos, moving pictures, applications and the like. The storage unit 160 may include such a digital data storage space as a flash memory, a random access memory (RAM), a solid state drive (SSD) and the like. According to an embodiment of the present invention, the storage unit 160 may be able to temporarily store data received from a digital device via the communication unit 140. In doing so, the storage unit 160 may be used for the buffering to output the data or content received from the digital device to the HMD 100. According to the present invention, the storage unit 160 may be optionally provided to the HMD 100.

The power unit 170 is the power source connected to a battery in a device or an external power source and may be able to supply power to the HMD 100.

The processor 110 of the present invention may be able to execute the contents received via data communications, the contents saved in the storage unit 160 and the like. Moreover, the processor 110 may be able to activate various applications and to process the data inside the device. In addition, the processor (or, main control unit) 110 may be able to control various units of the HMD 100 mentioned in the above description and data transmissions and receptions between the units.

In the block diagram of the HMD 100 shown in FIG. 2 the separately illustrated blocks indicate elements of the device logically and discriminatively. Therefore, the elements of the device mentioned in the above description may be installed in a manner of being integrated into one chip or a plurality of chips by the design of the device.

Figure 3:
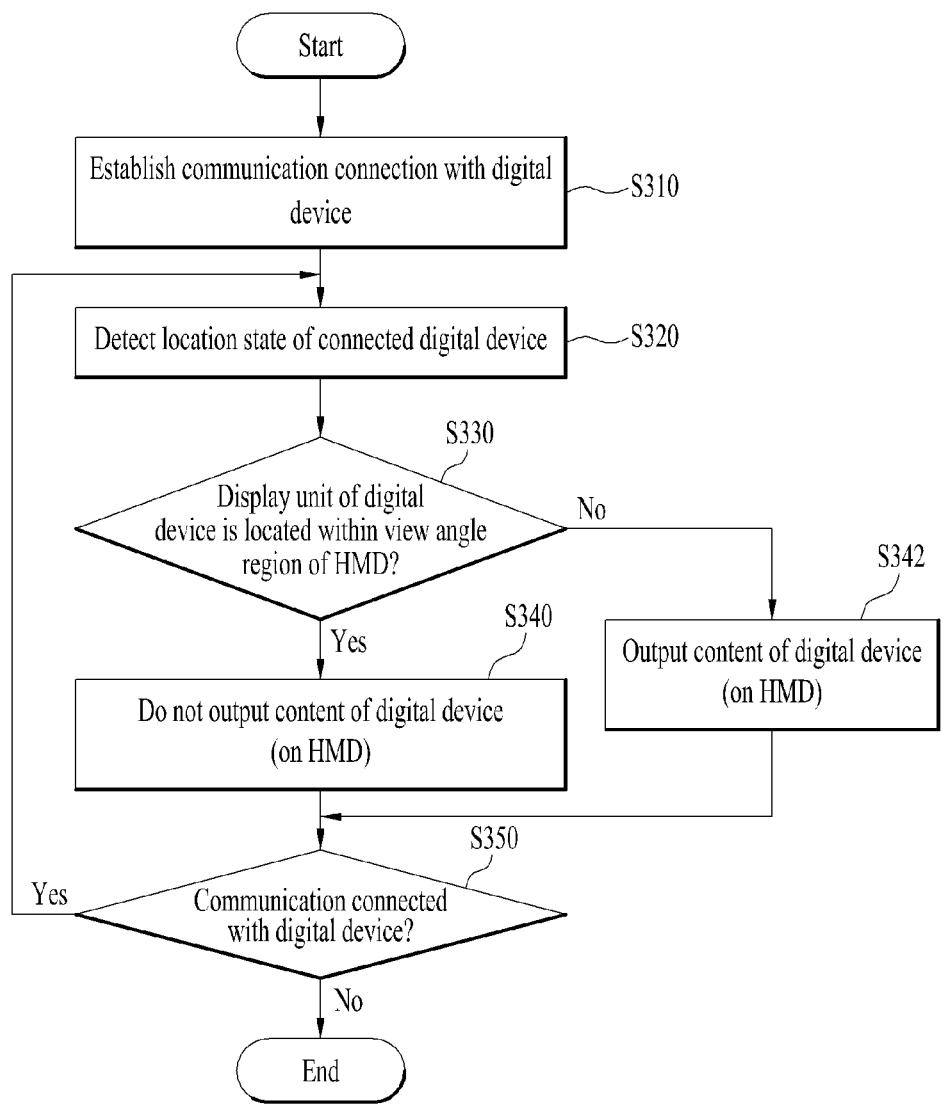
FIG. 3 is a flowchart for a content outputting method using an HMD according to one embodiment of the present invention.

FIG. 3 is a flowchart for a content outputting method using an HMD according to one embodiment of the present invention. In the following description, the steps shown in FIG. 3 may be controlled by the processor 110 of the HMD 100 shown in FIG. 2.

Referring to FIG. 3, an HMD of the present invention may be able to perform a communication connection with a digital device [S310]. In this case, the communication connection may be performed in repose to a user input performed on the HMD or the digital device. For instance, the HMD may be able to provide a separate button or user interface for the communication connection with the digital device. In dong so, a user may be able to perform the communication connection between the HMD and the digital device by performing a user input using the button or the user interface. Before the communication connection between the HMD and the digital device is performed, the HMD may be paired with the digital device. If the HMD of the present invention performs the communication connection with the digital device, the HMD may be able to transceive data with the digital device while a session is open.

Subsequently, the HMD of the present invention may be able to detect a location state of the connected digital device [S320]. According to the present invention, the location state may include a first state having the display unit of the digital device located in a preset view angle region of the HMD and a second state having the display unit of the digital device located outside the view angle region of the HMD. According to the present invention, the view angle region is a preset region corresponding to eyes of a user who is wearing the HMD and may include a section within a predetermined angle range in front direction of the HMD.

According to one embodiment of the present invention, the HMD may be able to detect a location state of a digital device using a plurality of antennas. In particular, the HMD may be able to perform transceive data with the digital device via a plurality of the antennas provided to the HMD. In dong so, using time differences, phase differences and the like of signals transceived via a plurality of the antennas, it may be able to detect relative locations and directions between the HMD and the digital device connected with the HMD. According to the present invention, even if a direction (e.g., an azimuth angle) having the digital device located therein is changing while a distance between the digital device is maintained constant, it may be able to accurately detect a location state of the digital device using a plurality of the antennas provided to the HMD.

According to another embodiment of the present invention, it may be able to detect a location state of the digital device using an image photographing sensor. In particular, while the HMD establishes a communication connection with the digital device, the image photographing sensor detects an image within the preset view angle region of the HMD and may be then able to provide the detected image to the processor of the HMD. Based on the image detected by the image photographing sensor, the processor may be able to detect whether a digital device (or, a display unit of the corresponding digital device) connected with the HMD is present within the view angle region of the HMD. For instance, the digital device connected with the HMD may be able to output a preset light pattern and the HMD is then able to detect the light pattern outputted from the digital device. In dong so, the light pattern may include at least one of a temporal pattern and a spatial pattern. Moreover, according to the embodiment of the present invention, the light pattern may be outputted from the display unit of the digital device.

If the digital device connected with the HMD is present within the view angle region of the HMD, the HMD may be able to detect the light pattern outputted from the digital device via the image photographing sensor. Otherwise, i.e., if the digital device connected with the HMD is not present within the view angle region of the HMD, the light pattern outputted from the digital device may not be detected via the image photographing sensor. Meanwhile, when a light pattern is outputted via the display unit of the digital device according to the embodiment of the present invention, even if the display unit of the corresponding digital device does not face a user despite that the digital device is present within the view angle region, the light pattern may not be detected. In particular, when a user is in a situation that the display unit of the digital device is not viewable, the HMD may be unable to detect the light pattern. Therefore, based on whether a light pattern of a digital device is detected within a view angle region, an HMD of the present invention may be able to detect a location state of the digital device.

When the digital device performs the communication connection with the HMD according to the embodiment of the present invention, the light pattern may be outputted via the display unit of the digital device, by which the present invention may be non-limited. Alternatively, according to the present invention, the digital device may be able to output a light pattern of itself irrespective of whether the digital device has performed the communication connection with the HMD.

Subsequently, the HMD of the present invention may be able to output a content currently displayed on the digital device to the HMD based on the detected location state of the digital device. To this end, based on the detected location state of the digital device, the HMD preferentially determines whether the display unit of the corresponding digital device is present within the view angle region of the HMD [S330]. If the display unit of the digital device is present within the view angle region, the HMD of the present invention may not output the currently displayed content of the digital device [S340]. On the contrary, if the display unit of the digital device is not present within the view angle region, the HMD of the present invention may be able to output the currently displayed content of the digital device [S342]. To this end, the HMD receives the currently displayed content of the digital device from the digital device and may be then able to output the received content to the display unit of the HMD.

Thus, according to the embodiment of the present invention, while the HMD is connected with the digital device, the HMD may be able to trigger whether to output a content of the digital device in accordance with a location state relative to that of the digital device. In particular, in the first state in which the display unit of the digital device is located within the view angle region of the HMD, the HMD does not output a currently displayed content of the digital device. On the other hand, in the second state in which the display unit of the digital device is not located within the view angle region of the HMD, the HMD may be able to output a currently displayed content of the digital device. Hence, in the second state in which a location of the digital device deviates from the view of the user wearing the HMD, the user may be able to be provided with the content of the digital device via the HMD. On the other hand, in the first state in which a location of the digital device lies within the view of the user wearing the HMD, the user may be able to be provided with the content via the digital device without interference via the display of the HMD.

Meanwhile, according to another embodiment of the present invention, after a detected location state of a digital device has been switched, if the switched location state is maintained over a preset time, an HMD may be able to trigger whether to output a content of the digital device. In particular, if the location state of the digital device is switched into a second state from a first state in which the content of the digital device is not outputted, when the location state of the digital device is maintained in the second state over the preset time, the HMD may be able to output the content of the digital device. Moreover, if the location state of the digital device is switched into the first state from the second state in which the content of the digital device is outputted, when the location state of the digital device is maintained in the first state over a preset time, the HMD may be able to terminate the output of the content of the digital device.

Subsequently, the HMD of the present invention determines whether the communication connection with the digital device is ongoing [S350]. If the communication connection with the digital device is ongoing, the HMD goes back to the step S320 and then detects a location state of the paired digital device. If the communication connection between the HMD and the digital device is terminated, the HMD may terminate the content output of the digital device.

In particular, an HMD according to the present invention may be able to detect a real-time location state of a digital device while a communication connection is established between the HMD and the digital device. Based on the detected location state, it may be able to determine whether a content currently displayed by the digital device will be outputted to the HMD. If the detected location state is switched, it may be able to adjust whether to output the content of the digital device to the HMD based on the switched location state. If the communication connection with the digital device is terminated, the HMD may be able to terminate both of the job of detecting the location state of the digital device and the job of outputting the content of the digital device.

Figure 4:
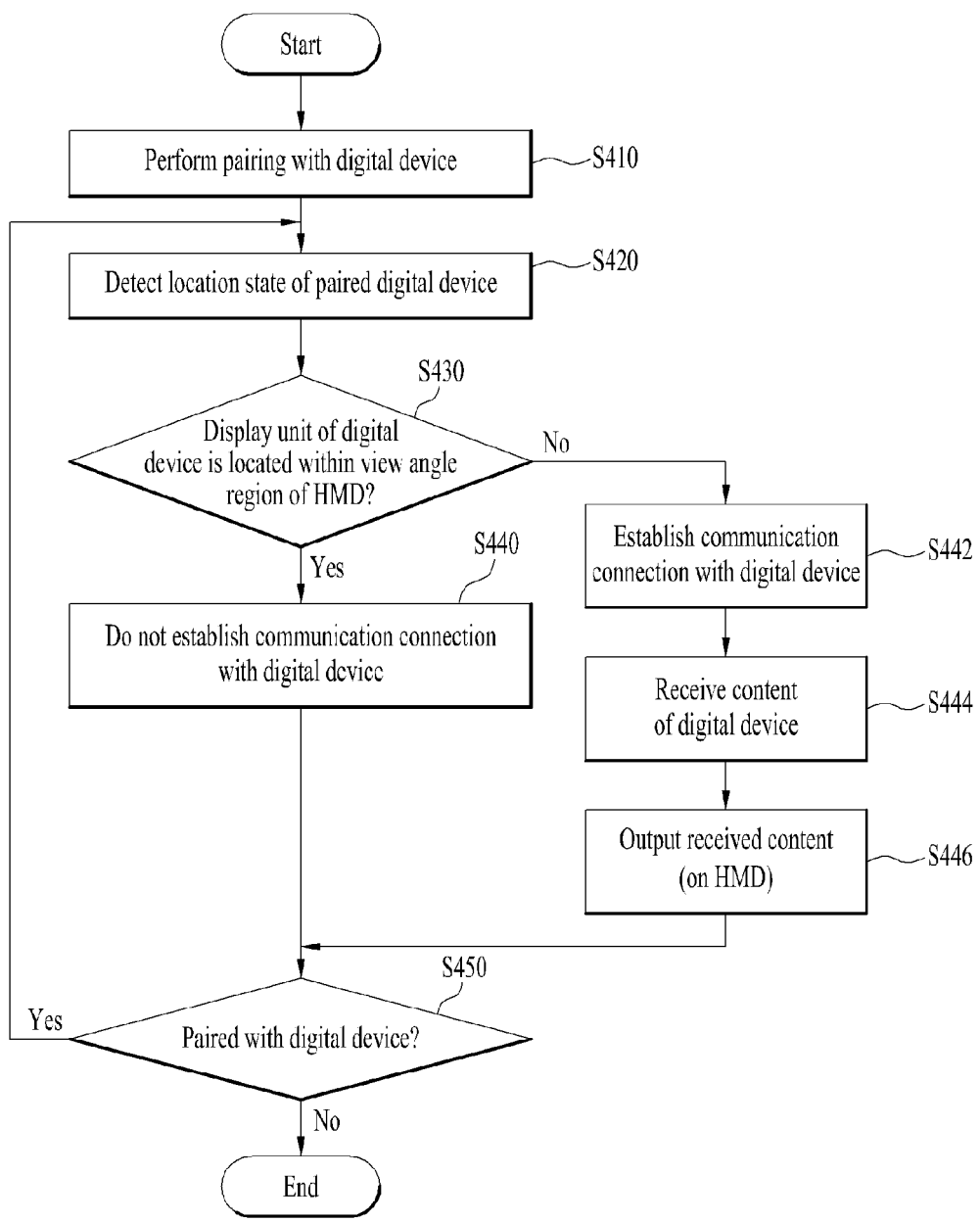
FIG. 4 is a flowchart for a content outputting method using an HMD according to another embodiment of the present invention.

FIG. 4 is a flowchart for a content outputting method using an HMD according to another embodiment of the present invention. According to the present invention, the processor 110 of the HMD 100 shown in FIG. 2 may be able to control the operations of the respective steps mentioned in the following. In the following description of the embodiment with reference to FIG. 4, details of the same or similar parts of the former embodiment described with reference to FIG. 3 shall be omitted.

Referring to FIG. 4, an HMD of the present invention performs a pairing with a digital device [S410]. Subsequently, the HMD may be able to detect a location state of the paired digital device [S420]. The detailed embodiments of the steps S410 and S420 are identical to those of the former steps S310 and S320 described with reference to FIG. 3. Yet, in the embodiment of the step S420, the HMD may be able to detect the location state of the paired digital device despite that a communication connection with the digital device is not performed yet. To this end, according to one embodiment of the present invention, the HMD may be able to detect the location state of the corresponding digital device based on whether a light pattern outputted from the digital device is detected.

Subsequently, based on the detected location state of the digital device, it may be able to determine whether to establish a communication connection between the HMD and the digital device. To this end, the HMD preferentially determines whether the display unit of the corresponding digital device is present within the view angle region of the HMD based on the detected location state of the digital device [S430]. If the display unit of the digital device is present within the view angle region, the HMD of the present invention may not establish the communication connection with the digital device [S440]. On the contrary, if the display unit of the digital device is not present within the view angle region, the HMD may be able to establish the communication connection with the digital device [S442]. If the HMD establishes the communication connection with the digital device, it may be able to receive a currently displayed content of the digital device from the digital device [S444]. The HMD of the present invention may be then able to output the received content [S446].

Thus, according to the embodiment of the present invention, while the HMD and the digital device are paired with each other, the HMD may be able to trigger whether to establish the communication connection with the digital device in accordance with a location state relative to that of the digital device. In particular, in the first state in which the display unit of the digital device is located within the view angle region of the HMD, the communication connection between the HMD and the digital device is established. On the other hand, in the second state in which the display unit of the digital device is not located within the view angle region of the HMD, the communication connection between the HMD and the digital device is not established. Once the communication between the HMD and the digital device is established, the HMD receives a currently activated content of the digital device by real time and may be then able to output the received content.

Meanwhile, according to another embodiment of the present invention, after a detected location state of a digital device has been switched, if the switched location state is maintained over a preset time, it may be able to trigger whether to establish a communication connection between an HMD and the digital device. In particular, if the location state of the digital device is switched into a second state from a first state in which the communication connection between the HMD and the digital device is not established, when the location state of the digital device is maintained in the second state over the preset time, it may be able to establish the communication connection between the HMD and the digital device. Moreover, if the location state of the digital device is switched into the first state from the second state in which the communication connection between the HMD and the digital device is established, when the location state of the digital device is maintained in the first state over a preset time, the HMD may be able to terminate the communication connection between the HMD and the digital device.

Subsequently, the HMD of the present invention determines whether the HMD is being paired with the digital device is ongoing [S450]. If the HMD is being paired with the digital device, the HMD goes back to the step S420 and then detects a location state of the paired digital device. If the pairing between the HMD and the digital device is terminated, the HMD may terminate the content output of the digital device.

In particular, an HMD according to the present invention may be able to detect a real-time location state of a digital device while paired with the digital device. Based on the detected location state, it may be able to determine whether to establish a communication connection between the HMD and the digital device. If the detected location state is switched, it may be able to adjust whether to establish the communication connection between the HMD and the digital device based on the switched location state. If the pairing with the digital device is terminated, the HMD may be able to terminate both of the job of detecting the location state of the digital device and the job of outputting the content of the digital device.

Figure 5:
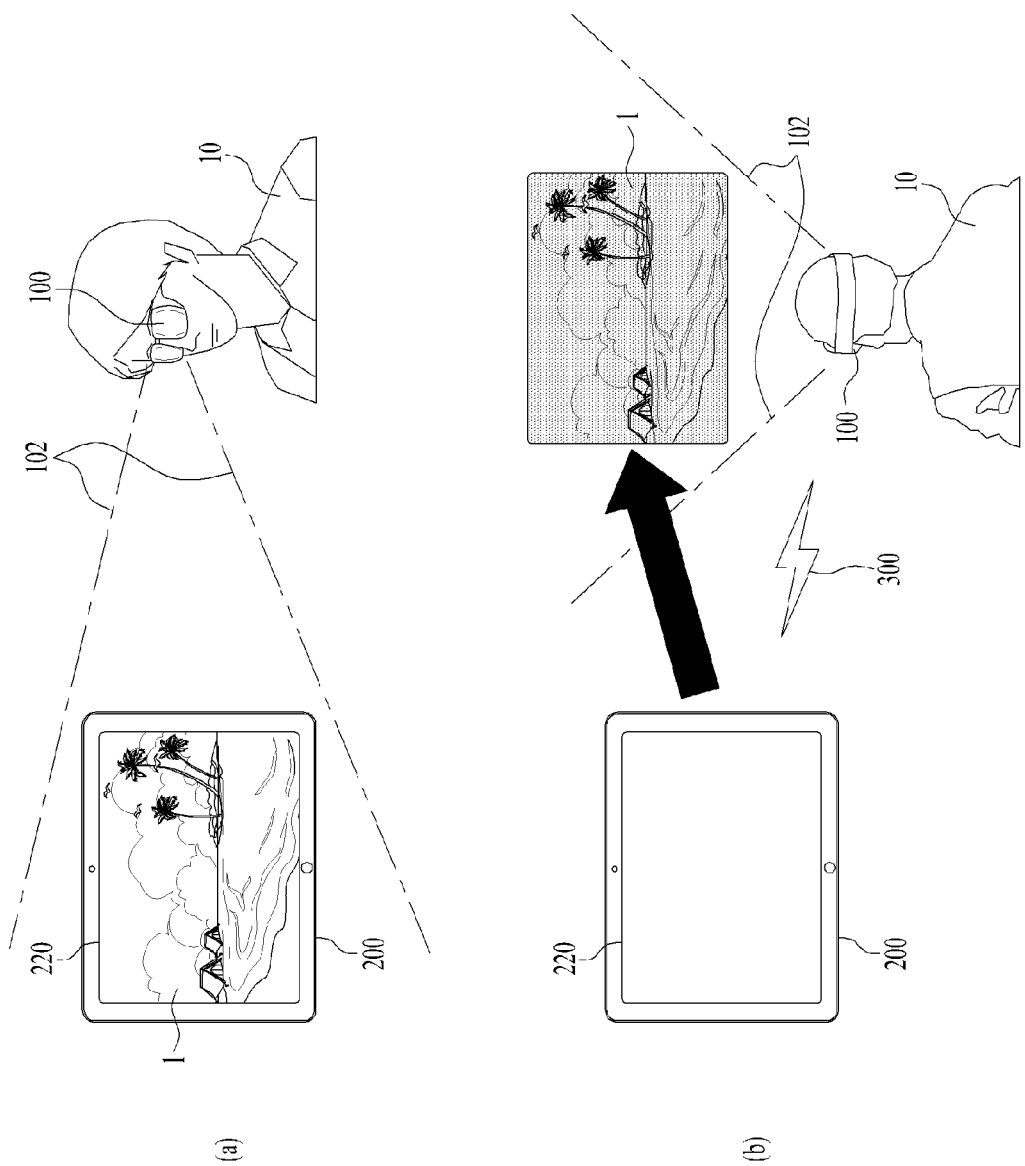
FIGS. 5 to 7 are diagrams for one detailed examples of outputting a content using an HMD of the present invention.
Figure 6:
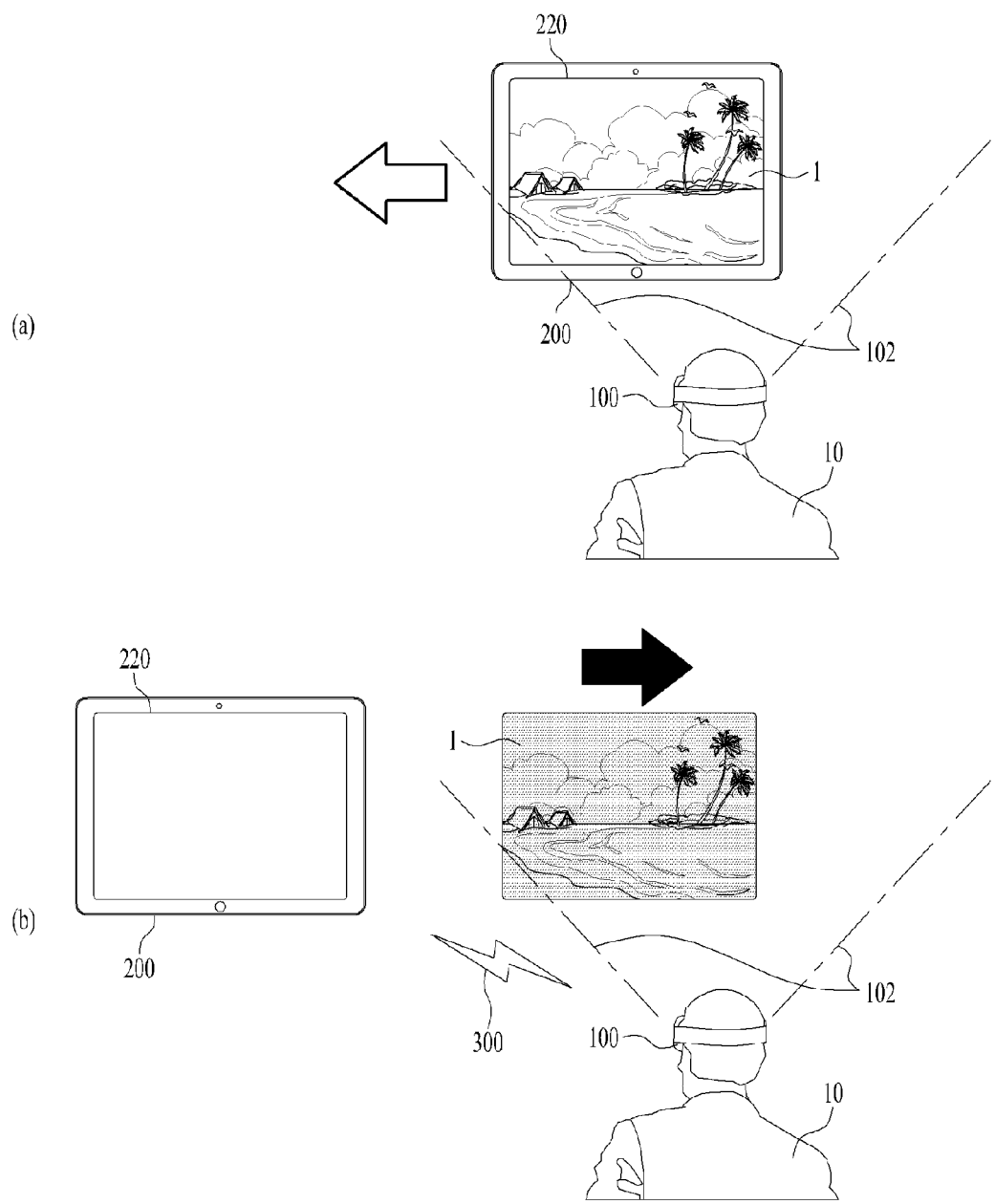
Figure 7:
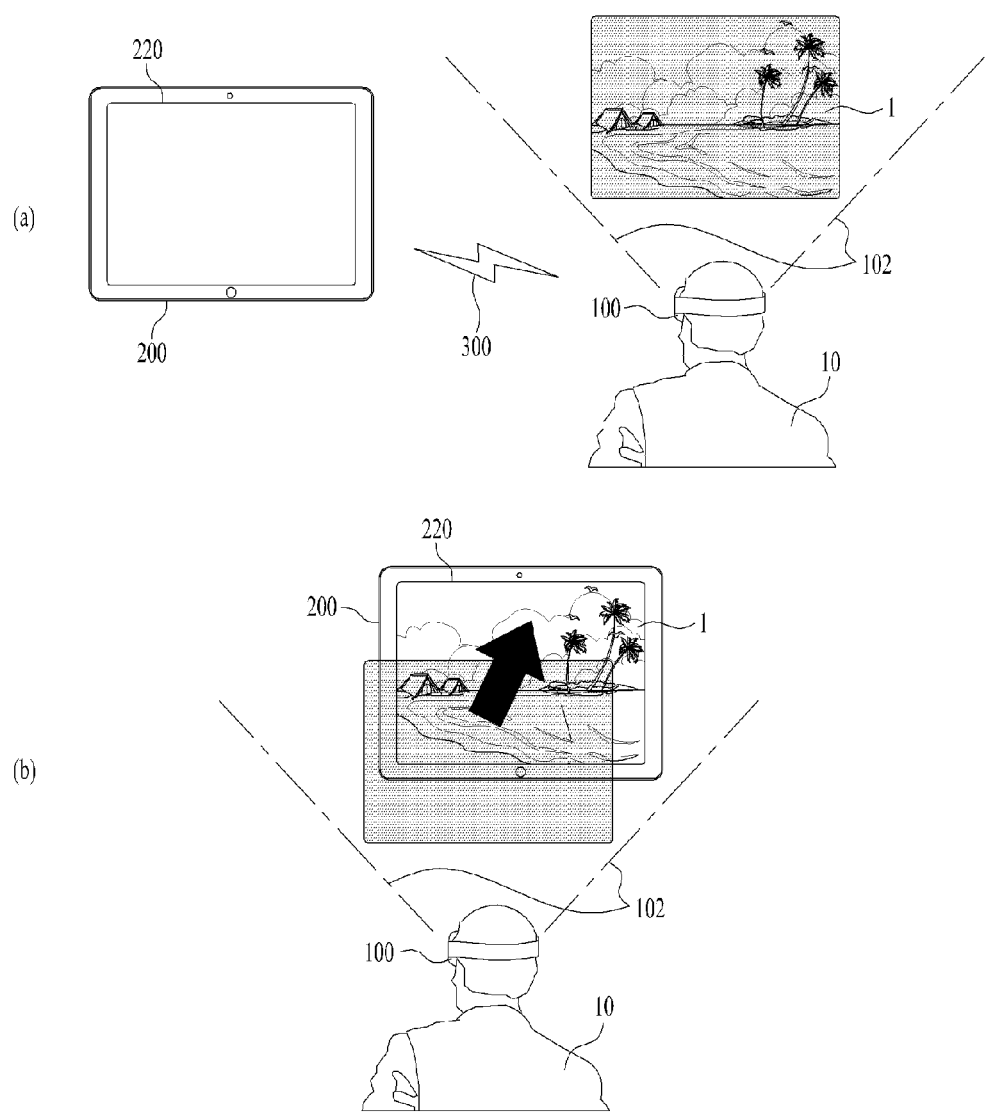

FIGS. 5 to 7 are diagrams for one detailed examples of outputting a content 1 using an HMD 100 of the present invention. In the embodiments shown in FIGS. 5 to 7, an HMD 100 is being paired with a digital device 200. Referring to FIGS. 5 to 7, it may be able to control an output of a content 1 of the HMD 100 based on a location state of a digital device 200 with reference to the HMD 100, i.e., relative locations and directions between the HMD 100 and the digital device 200.

First of all, FIG. 5 and FIG. 6 show a case that the location state of the digital device 200 is switched into a second state [FIG. 5 (b)] from a first state [FIG. 5 (a)] according to an embodiment of the present invention. In doing so, the content 1 currently displayed on the digital device 200 moves to the HMD 100 and may be then displayed on the HMD 100.

In particular, referring to FIG. 5 (a), a user 10 is able to watch the content 1 displayed on a display unit 220 of the digital device 200 while wearing the HMD 100 of the present invention. In doing so, the display unit 220 of the digital device 200 may be located within a view angle region 102 of the HMD 100. According to an embodiment of the present invention, if the display unit 220 of the digital device 200 is present within the view angle region 102 of the HMD 100, the HMD 100 does not output the content 1. According to one embodiment of the present invention, in FIG. 5 (a), the HMD 100 may be in a state that a communication connection with the digital device 200 is not established.

Meanwhile, referring to FIG. 5 (b), according to an embodiment of the present invention, while a user 10 is wearing the HMD 100, the user 10 may look at a different spot instead of looking at the display unit 220 of the digital device 200. In doing so, the display unit 220 of the digital device 200 may be located outside the view angle region 102 of the HMD 100. Thus, if the display unit 220 of the digital device 200 is present outside the digital device 200, the HMD 100 may be able to output the content 1. According to one embodiment of the present invention, in FIG. 5 (b), the HMD 100 has already established the communication connection with the digital device 200. Hence, the HMD 100 receives the content 1 from the digital device 200 via a network 300 by real time and may be then able to output the received content 1. Meanwhile, according to the embodiment of the present invention, the digital device 200 may stop displaying the content 1 in the second state in which the digital device 200 is located outside the view angle region 102 of the HMD 100.

According to the embodiment of the present invention, when the location state of the digital device 200 is switched from the first state, in which the location state is located within the view angle region 102 of the HMDD, into the second state in which the location state is located outside the view angle region 102 of the HMD 100, an appropriate feedback may be provided on the HMD 100. For instance, if the location state of the digital device 200 is switched into the second state from the first state, the HMD 100 may be able to provide a vibration feedback. For another instance, if the location state of the digital device 200 is switched into the second state from the first state, the HMD 100 may be able to output the content 1 by fade-in. For another instance, the HMD 100 may be able to output the content 1 after a preset time. In particular, the HMD 100 may be able to output the content 1 after duration of the preset time from a time in which the location state of the digital device 200 was switched. Moreover, the digital device 200 may be able to stop an output of the content 1 during the preset time from the time in which the location state of the digital device 200 was switched. After duration of the preset time, the digital device 200 may continue to output the content 1. For instance, if the content 1 is a video content and the location state of the digital device 200 is switched from the first state into the second state, the digital device 200 may be able to pause the output of the video content during a preset time.

Meanwhile, according to another embodiment of the present invention shown in FIG. 6, when the location state of the digital device 200 is switched from the first state to the second state, the HMD 100 may be able to output the content 1 in a manner that the content 1 slides to move. In doing so, the HMD 100 enables the content 1 to slide to move into a center region from a side in which the display unit 220 of the display device 200 deviating from the view angle region 102 is located. For instance, if the digital device 200 in the first state deviates from the view angle region 102 of the HMD 100 and then enters the second state [FIG. 6 (a)], the HMD 100 enables the content 1 to be displayed in a manner that the content 1 slides to move to a center region from a left side in which the digital device 200 deviating from the view angle region 102 is located [FIG. 6 (b)]. In this case, the center region is the region situated at a central part of a frame displayed by the display unit and may include a preset region situated at a central part of the view angle region 102.

FIG. 7 shows that a location state of a digital device 200 is switched to a first state [FIG. 7 (b)] from a second state [FIG. 7 (a)] according to an embodiment of the present invention. In this case, an HMD 100 may be able to terminate an output of a currently displayed content 1. According to another embodiment of the present invention, if the digital device 200 pauses a display of the contents 1 in the second state, the digital device 200 may be able to resume the paused display of the content 1 in the first state. Therefore, the content 1 displayed on the HMD 100 may be displayed by moving into the digital device 200.

In particular, according to an embodiment of the present invention, referring to FIG. 7 (a), a user 10 may look at a different spot instead of looking at a display unit 220 of a digital device 200 while wearing an HMD 100. Thus, if the display unit 220 of the digital device 200 is located outside the view angle region 102 of the HMD 100, the HMD 100 may be able to output a content 1. According to one embodiment of the present invention, in FIG. 7 (a), the HMD 100 may have established a communication connection with the digital device 200. Hence, the HMD 100 receives the content 1 from the digital device 200 by real time via a network 300 and may be then able to output the received content 1. Meanwhile, according to an embodiment of the present invention, the digital device 200 may pause a display of the content 1 in a second state in which the digital device 200 is located outside the view angle region 102 of the HMD 100.

Referring to FIG. 7 (b), the user 10 may look at the display unit 220 of the digital device 200 while wearing the HMD 100. In doing so, the display unit 220 of the digital device 200 may be located within the view angle region 102 of the HMD 100. According to an embodiment of the present invention, if the display unit 220 of the digital device 200 is located within the view angle region 102 of the HMD 100, the HMD 100 may not output the content 1. According to one embodiment of the present invention, in FIG. 7 (b), the HMD 100 may not have established a communication connection with the digital device 200. Meanwhile, according to an embodiment of the present invention, if the digital device 200 pauses a display of the content 1, the digital device 200 may resume the display of the content 1.

Figure 8:
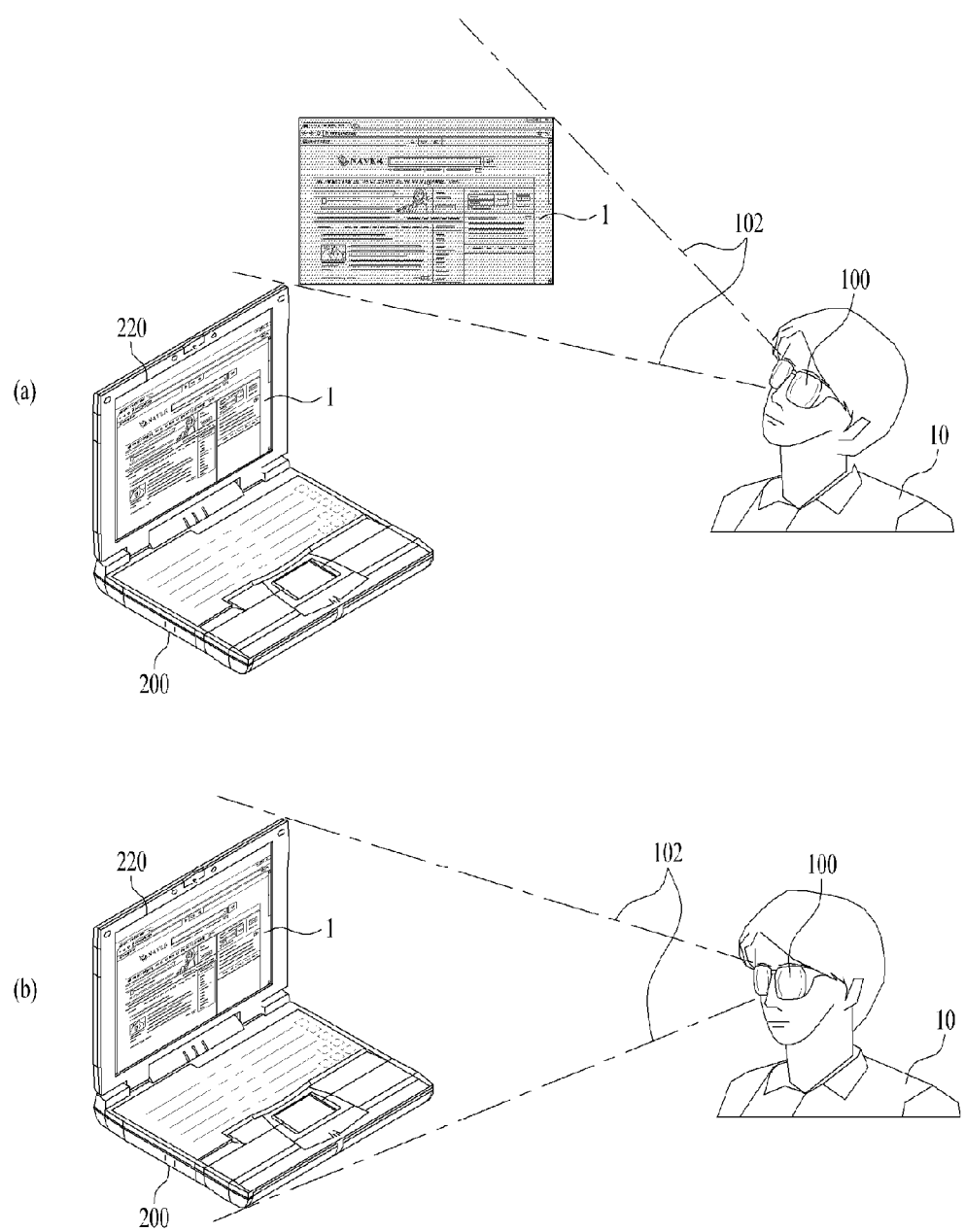

FIG. 8 shows that a location state of a digital device 200 is switched to a first state [FIG. 8 (b)] from a second state [FIG. 8 (a)] according to another embodiment of the present invention. According to the embodiment shown in FIG. 8, the digital device 200 may be able to display a content 1 in both of the first state and the second state.

According to one embodiment of the present invention, an HMD 100 may be able to adjust whether to output the content 1 based on whether the digital device 200 located within the view angle region 102 of the HMD 100 displays the same content 1 of the HMD 100.

Referring to FIG. 8 (a), a user 10 may look at a different spot instead of looking at a display unit 220 of a digital device 200 while wearing an HMD 100. Thus, if the display unit 220 of the digital device 200 is located outside the view angle region 102 of the HMD 100, the HMD 100 may be able to output a content 1. According to the embodiment shown in FIG. 8, the display device 200 is displaying the content 1 in a second state in which the digital device 200 is located outside the view angle region 102 of the HMD 100.

In this case, referring to FIG. 8 (b), the user 10 may look at the display unit 220 of the digital device 200 while wearing the HMD 100. In doing so, the digital device 200 having entered the view angle region 102 of the HMD 100 is displaying the content 1. The content 1 currently displayed by the digital device 200 may be identical to or different from the content 1 currently outputted by the HMD 100. In particular, if data are transmitted and received between the digital device 200 and the HMD 100 by real time, the content 1 currently displayed by the digital device 200 may be identical to the content 1 currently outputted by the HMD 100. On the contrary, if data are not transmitted and received between the digital device 200 and the HMD 100 by real time, the content 1 currently displayed by the digital device 200 may not be identical to the content 1 currently outputted by the HMD 100. For instance, in case that the content 1 is a webpage, a webpage change in response to a URL access change of the digital device 200 may not be delivered to the HMD 100 yet.

Hence, the HMD 100 according to an embodiment of the present invention determines whether the content 1 displayed by the digital device having entered the view angle region 102 is identical to the content 1 currently outputted by the HMD 100. If the content 1 displayed by the digital device is identical to the content 1 currently outputted by the HMD 100, referring to FIG. 8 (b), the HMD 100 may be able to avoid the overlapping of the display of the content 1 by terminating the output of the content 1. Otherwise, i.e., if the content 1 displayed by the digital device is not identical to the content 1 currently outputted by the HMD 100, the HMD 100 may not terminate the output of the content 1.

Meanwhile, according to the embodiment of the present invention, when the location state of the digital device 200 is switched into a first state, in which the location state is located within the view angle region 102 of the HMDD, into a second state in which the location state is located outside the view angle region 102 of the HMD 100, an appropriate feedback may be provided on the HMD 100. For instance, if the location state of the digital device 200 is switched into the first state from the second state, the HMD 100 may be able to provide a vibration feedback. For another instance, if the location state of the digital device 200 is switched into the first state from the second state, the HMD 100 may be able to fade out the content 1.

FIG. 9 shows another embodiment of outputting a content 1 using an HMD 100 of the present invention. According to an embodiment of the present invention, a location state of a digital device 200 is determined based on a location of the digital device 200 and a direction of a display unit 220 of the digital device 200. In particular, the location state may be determined based on whether the display unit 220 of the digital device 200 is located within a view angle region 102 of an HMD 100. According to one embodiment of the present invention, it may be able to detect the location state of the According to one embodiment of the present invention, based on whether a light pattern 5 outputted by the digital device 200 is detected.

Referring to FIG. 9 (a), while the digital device 200 is located within the view angle region 102 of the HMD 100, the display unit 220 of the digital device 200 may be enabled to face the HMD 100. In doing so, the HMD 100 may be able to detect the light pattern 5 outputted by the digital device 200. If the light pattern 5 is detected, the HMD 100 recognizes a location state of the digital device 200 as a first state and does not output the content 1 of the digital device 200 correspondingly.

Meanwhile, referring to FIG. 9 (b), the digital device shown in FIG. 9 (a) may be inverted. In particular, despite that the digital device 200 is located within the view angle region 102 of the HMD 100, the display unit 220 of the digital device 200 may be set not to face the HMD 100. In dong so, the HMD 100 may not be able to detect the light pattern 5 outputted by the digital device 200. According to an embodiment of the present invention, the HMD 100 may recognize the location state of the digital device 200 shown in FIG. 9 (b), in which the light pattern 5 is not detected, as a second state. Hence, the HMD 100 may be able to output the content 1 of the digital device 200.

FIG. 10 shows a further embodiment of outputting a content 1 using an HMD 100 of the present invention. According to an embodiment of the present invention, in a second state in which a display unit 220 of a digital device 200 is not located within a view angle region 102 of an HMD 100, it may be able to detect whether a display unit 222 of at least one external device 202 is present in the view angle region 102. If it is detected that detect the display unit 222 of the at least one external device 202 is present in the view angle region 102, the display unit 222 of the corresponding external device 202 may be able to output a content 1 of the digital device 200.

For instance, referring to FIG. 10 (a), the display unit 220 of the digital device 200 may be located outside the view angle region 102 of the HMD 100. In this case, the HMD 100 may be able to output the content of the digital device 200, of which details are mentioned in the foregoing description with reference to FIG. 7 (a).

Meanwhile, in the second state in which display unit 220 of the digital device 200 is located outside the view angle region 102 of the HMD 100, referring to FIG. 10 (b), the external device 202 may be located within the view angle region 102 of the HMD 100. In particular, the HMD 100 may be able to detect the display unit 222 of the external device 202 located within the view angle region 102. Thus, if the display unit 222 of the external device 202 is detected within the view angle region 102, the content 1 may be outputted to the display unit 222 of the corresponding external device 202. To this end, the detected external device 202 may be able to establish a communication connection with the digital device 200. Once the communication connection is established between the external device 202 and the digital device 200, the external device 202 may be able to receive the content 1 from the digital device 200 using the network 300. And, the received content 1 may be outputted to the display unit 222 of the external device 202.

Figure 11:
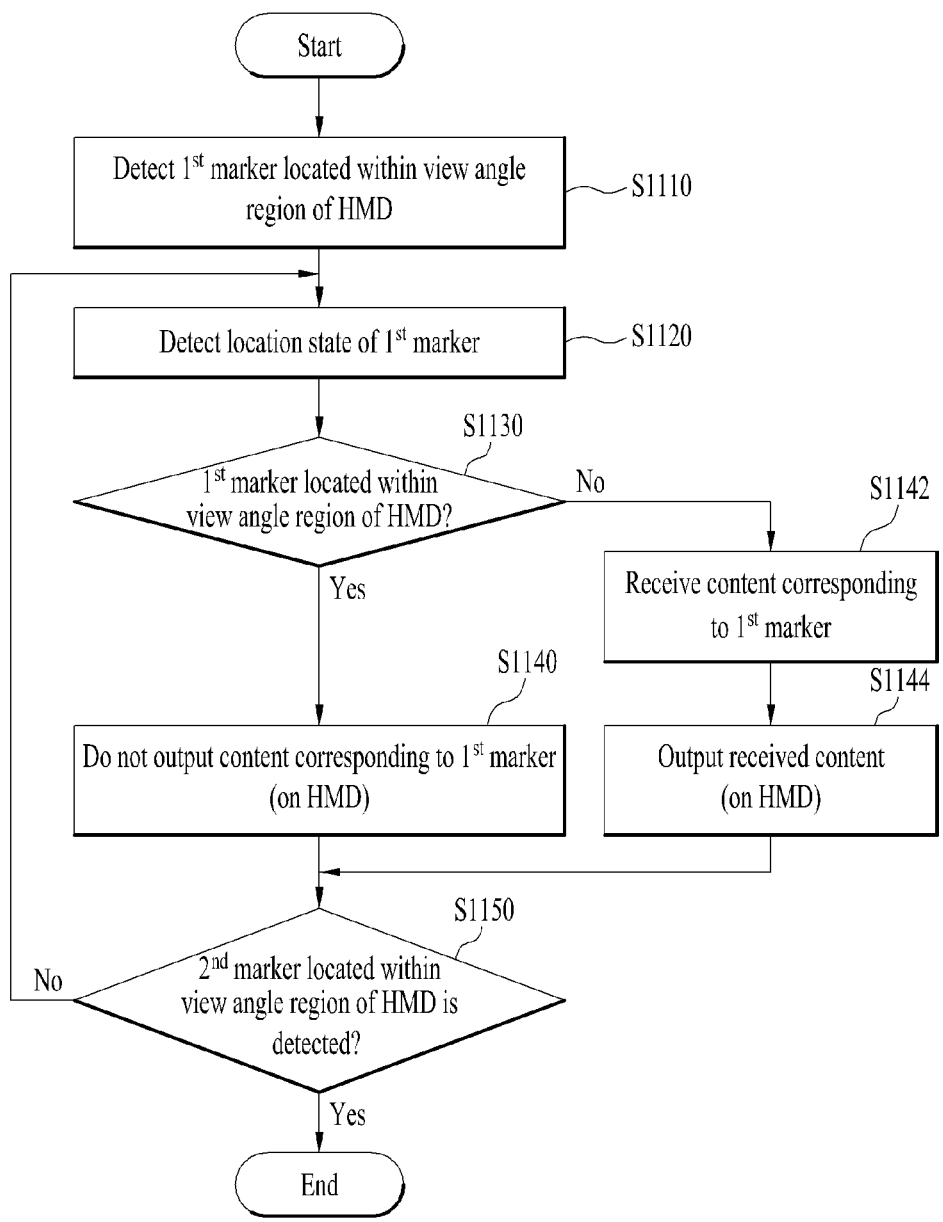
FIG. 11 is a flowchart for a content outputting method using an HMD according to a further embodiment of the present invention.
Figure 12:
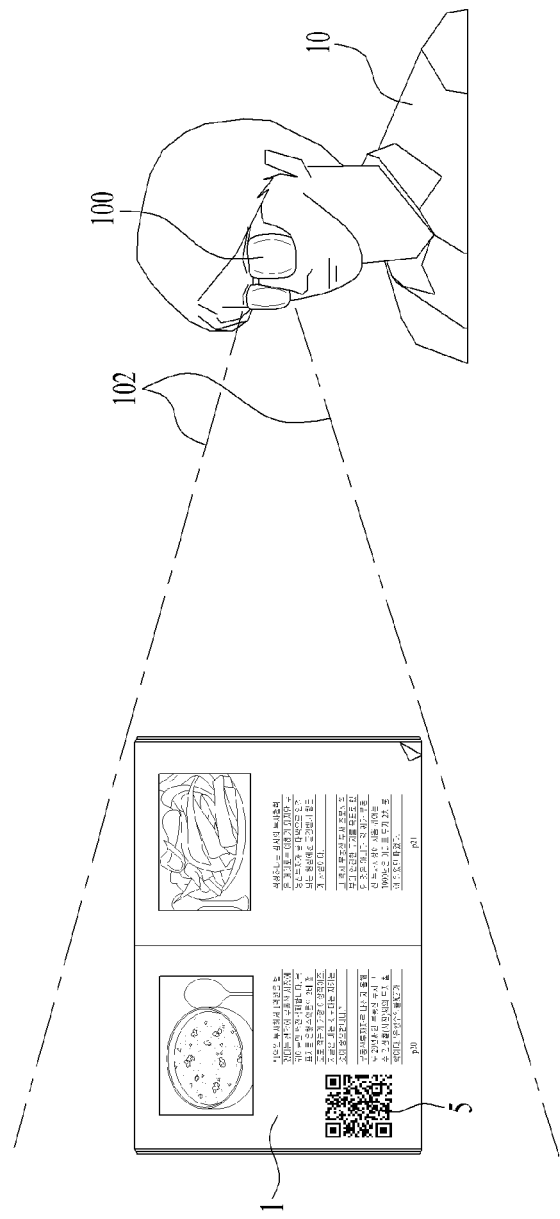
FIG. 12 and FIG. 13 are diagrams for further detailed examples of outputting a content using an HMD of the present invention.
Figure 13:
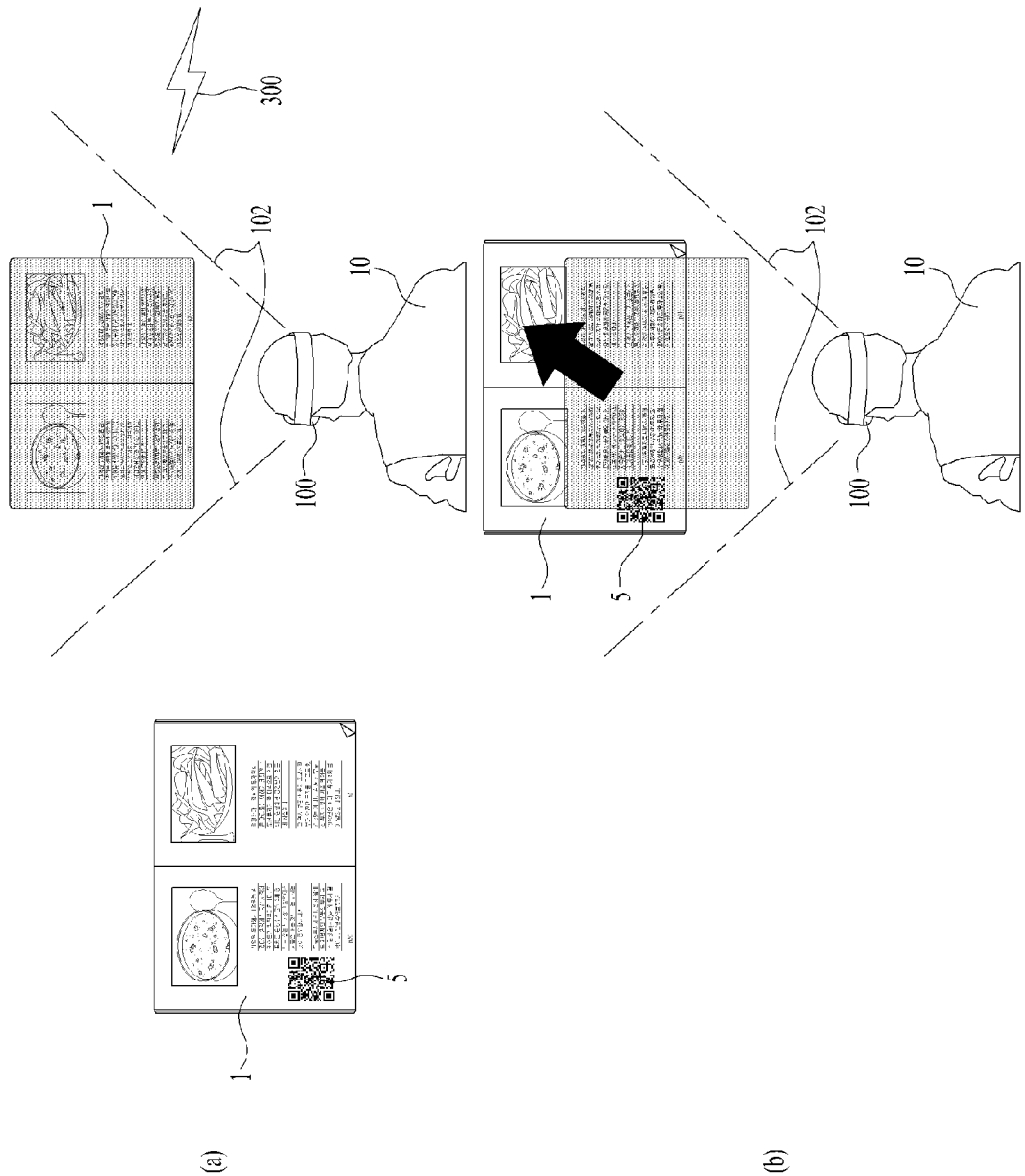

FIGS. 11 to 13 show further embodiments of the present invention.

In particular, FIG. 11 is a flowchart for a content outputting method using an HMD according to a further embodiment of the present invention. According to the present invention, the processor 110 of the HMD 100 shown in FIG. 2 may be able to control the following operations of the respective steps shown in FIG. 1. Details of the same or similar parts in the former embodiment described with reference to FIG. 3 shall be omitted in the description of the present embodiment with reference to FIG. 11.

Referring to FIG. 11, an HMD of the present invention detects a first marker located within a view angle region of the HMD [S1110]. In particular, a marker of the present invention is the identifier indicating content information and may include one of a bar code, a QR code, an RFID, a color code, an image code and the like.

Subsequently, the HMD may be able to detect a location state of the first marker [S1120]. The location state of the present invention may include a first sate having the first marker located within a preset view angle region of the HMD and a second state having the first marker not located within the view angle region. According to an embodiment of the present invention, the HMD may be able to detect the location state of the first marker using an image photographing sensor. In particular, the image photographing sensor detects an image within the preset view angle region and may then provide the detected image to a processor of the HMD. The processor may be able to detect whether the first marker is present within the view angle region of the HMD based on the image detected by the image photographing sensor.

Subsequently, based on the detected location state of the first marker, the HMD may be able to determine whether to output a content corresponding to the first marker. To this end, based on the detected location state of the first marker, the HMD determines whether the first marker is located within the view angle region of the HMD [S1130]. If the first marker is located within the view angle region of the HMD, the HMD does not output the content corresponding to the first marker [S1140]. Otherwise, i.e., if the first marker is not located within the view angle region of the HMD, the HMD may be able to receive the content corresponding to the first marker [S1142]. In dong so, the HMD may be able to receive the content from a server via the network. Once the content is received from the server, the HMD outputs the received content [S1144].

Subsequently, the HMD keeps determining whether a marker within the view angle region is detected. In dong so, the HMD may be able to determine whether a second marker different from the first marker is detected within the view angle region [S1150]. If the second marker is not detected, the HMD goes back to the step S1120 and then continues the content output operation in accordance with the location state of the first marker. In particular, based on the location state of the first marker, the HMD may be able to trigger whether to output the content corresponding to the first marker. If the second marker is detected, the HMD terminates the content output operation in accordance with the location state of the first marker. In doing so, the HMD may be able to detect the location state of the newly detected second marker and may be then able to perform a content output in accordance with the location state of the second marker by the same method mentioned in the foregoing description of the embodiment with reference to FIG. 11.

FIG. 12 and FIG. 13 show a detailed method of outputting a content using an HMD in accordance with the former embodiment shown in FIG. 11.

Referring to FIG. 12, a user 10 may be able to watch a content 1 including a marker 5 while wearing an HMD 100. In this case, the content 1 may include an analog content instead of a digital content. And, the content 1 may include a partial or whole region of a book, a magazine, a newspaper, a photo or the like. The content 1 may include the marker 5 indicating the information on the corresponding content 1. According to an embodiment of the present invention, the marker is located within a view angle region 102 of the HMD 100. And, the HMD 100 does not output the content 1.

Referring to FIG. 13 (a), according to an embodiment of the present invention, the user 10 may look at a different spot other than the content 1 while wearing the HMD 100. In doing so, the marker 5 included in the content 1 may be located outside the view angle region 102 of the HMD 100. In particular, a location state of the marker 5 may be switched from a first state [FIG. 12] to a second state [FIG. 13 (a)]. Thus, if the marker is located outside the view angle region 102 of the HMD 100, the HMD 100 may be able to output the content 1 corresponding to the marker 5. In particular, the HMD 100 receives the content 1 corresponding to the marker 5 from a server (not shown in the drawing) via a network 300 and may be then able to output the received content.

Meanwhile, referring to FIG. 13 (b), the user 10 may be able to look at the content 1 again while wearing the HMD 100. In dong so, the marker 5 included in the content 1 may be located within the view angle region of the HMD 100. In particular, the location state of the marker 5 may be switched from the second state [FIG. 13 (a)] to the first state [FIG. 13 (b)]. Thus, if the marker 5 reenters the view angle region 102 of the HMD 100, the HMD 100 may be able to terminate the output of the content 1 corresponding to the marker 5.

Meanwhile, according to one embodiment of the present invention, the HDM 100 may be able to adjust whether to output the content 1 based on whether the content 1 located with the view angle region 102 of the HMD 100 is identical to the content 1 currently outputted by the HMD 100. In particular, the HMD 100 determines whether the content 1 having entered the view angle region 102 is identical to the content 1 currently outputted by the HMD 100. If the content 1 having entered the view angle region n102 is identical to the content 1 currently outputted by the HMD 100, referring to FIG. 13 (b), the HMD 100 may be able to avoid the overlapping of the display of the content 1 by terminating the output of the content 1. Otherwise, i.e., if the content 1 having entered the view angle region 102 is not identical to the content 1 currently outputted by the HMD 100, the HMD 100 may not terminate the output of the content 1.

According to the present invention, a location state of a digital device may be determined based on eyes of a user who wears an HMD. The HMD of the present invention may further include an image photographing sensor configured to detect a position of the pupil of the user wearing the HMD and may be able to track eyes of the corresponding user using the image photographing sensor. Therefore, the location state of the digital device of the present invention may be determined based on whether a display unit of the digital device is located within a view angle region of the user wearing the HMD. In this case, the view angle region may include a region within a predetermined range corresponding to the eyes of the user wearing the HMD. In particular, according to the present invention, the location state of the digital device may include a third state in which the display unit of the digital device is located within the view angle region of the user wearing the HMD and a fourth state in which the display unit of the digital device is not located within the view angle region of the user wearing the HMD. Meanwhile, according to an embodiment of the present invention, a location state of a marker may be also determined based on the eyes of the user wearing the HMD in the manner mentioned in the above description.

HMD mentioned in the description of the present invention may be changeable with or replaceable by various devices for the purposes of the present invention. For instance, HMD of the present invention may include such a device, which is capable of providing a display by being put on a user, as EMD (eye mounted display), eyeglass, eyepiece, eyewear, HWD (head worn display) and the like. And, the HMD may be non-limited by the terminologies used for the description of the present invention.

As mentioned in the foregoing description, all the related matters are described in BEST MODE for embodiments of the present invention.

As mentioned in the foregoing description, the present invention may be applicable to electronic devices entirely or in part.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of outputting a content using an HMD (head mounted display), the method comprising:
   performing a pairing with a digital device having at least one display unit configured to display a first content;
   detecting a location state of the paired digital device, wherein the location state comprises a first state in which a display unit of the digital device is located within a preset view angle region of the HMD and a second state in which the display unit of the digital device is not located within the preset view angle region of the HMD;
   when the location state is changed from the first state to the second state, receiving the first content which is displayed by the digital device and outputting the first content that is on the HMD; and
   when the location state is changed from the second state to the first state, determining whether a second content currently being displayed on the digital device is identical to the first content currently being output on the HMD, and terminating the output of the first content on the HMD when the second content is identical to the first content or continuing the output of the first content on the HMD when the second content is not identical to the first content,
   wherein the first content output on the HMD is the same identical first content displayed on the digital device without changing a spatial dimension and without augmenting a reality of the first content displayed on the digital device.

2. The method of claim 1, wherein the receiving step further comprises:
   establishing a communication connection with the digital device; and
   receiving the first content currently displayed on the communication connected digital device when the location state is changed from the first state to the second state.

3. The method of claim 1, wherein the outputting step further comprises determining whether to output the content to the HMD if the detected location state is switched and the switched location state continues over a preset time.

4. The method of claim 1, further comprising:
   if the detected location state is switched between the first state and the second state, providing a vibration feedback on the HMD.

5. The method of claim 1, wherein the outputting step further comprises fading in the first content if the detected location state is switched from the first state to the second state.

6. The method of claim 1, wherein the outputting step further comprises fading out the first content if the detected location state is switched from the second state to the first state.

7. The method of claim 1, wherein the outputting step further comprises when the detected location state is switched from the first state to the second state, outputting the first content in a manner that the first content slides to move into a center region from a side in which the display unit of the digital device deviating from the location of the view angle region.

8. The method of claim 1, wherein if the first content comprises a video content and the detected location state is switched from the first state to the second state, an output of the video content of the digital device is paused for a preset time period.

9. The method of claim 1, wherein the detecting step further comprises detecting the location state using signals transceived with the digital device via a plurality of antennas included in the HMD.

10. The method of claim 1, wherein the detecting step further comprises detecting the location state based on whether a light pattern output by the paired digital device is detected.

11. The method of claim 1, further comprising:
    if the detected location state is the second state, detecting whether a display unit of at least one external device is present within the view angle region; and
    if the display unit of the at least one external device is detected within the view angle region, outputting the first content to the display unit of the corresponding external device.

12. The method of claim 1, wherein the location state comprises a third state in which the display unit of the digital device is located within a view angle region of a user wearing the HMD and a fourth state in which the display unit of the digital device is not located within the view angle region of a user wearing the HMD.

13. An HMD (head mounted display) comprising:
    a processor configured to control an operation of the HMD;
    a display unit configured to output an image based on a command given by the processor; and
    a communication unit configured to transceive data with at least one digital device based on the command given by the processor,
    wherein the processor is further configured to:
      perform a pairing with a digital device having at least one display unit configured to display a first content,
      detect a location state of the paired digital device, the location state comprising a first state in which the display unit of the digital device is located within a preset view angle region of the HMD and a second state in which the display unit of the digital device is not located within the view angle region of the HMD, when the location state is changed from the first state to the second state, receive the first content which is displayed by the digital device and output the first content on the HMD, and when the location state is changed from the second state to the first state, determine whether a second content currently being displayed on the display device is identical to the first content currently being output on the HMD and terminate the output of the first content on the HMD when the second content is identical to the first content or continue the output of the first content on the HMD when the second content is not identical to the first content, and wherein the first content output on the HMD is the same identical first content displayed on the digital device without changing a spatial dimension and without augmenting a reality of the first content displayed on the digital device.

14. The HMD of claim 13, wherein the HMD establishes a communication connection with the digital device, and receives the first content currently displayed on the communication connected digital device when the location state is changed from the first state to the second state.

15. The HMD of claim 13, wherein the processor is further configured to determine the location state when the detected location state is switched and the switched location state continues over a preset time.

16. The HMD of claim 13, wherein if the detected location state is switched between the first state and the second state, a vibration feedback is provided to the HMD.

17. The HMD of claim 13, wherein if the detected location state is switched from the first state to the second state, the first content is faded in.

18. The HMD of claim 13, wherein if the detected location state is switched from the second state to the first state, the first content is faded out.

19. The HMD of claim 13, wherein when the detected location state is switched from first state to the second state, the first content is output in a manner that the first content slides to move into a center region from a side in which the display unit of the digital device deviating from the location of the view angle region.

20. The HMD of claim 13, wherein if the first content comprises a video content and the detected location state is switched from the first state to the second state, an output of the video content on the digital device is paused for a preset time period.

21. The HMD of claim 13, wherein the communication unit comprises a plurality of antennas and wherein the processor detects the location state using signals transceived with the digital device via a plurality of antennas included in the HMD.

22. The HMD of claim 13, wherein the location state is detected based on whether a light pattern output by the paired digital device is detected.

23. The HMD of claim 13, wherein if the detected location state is the second state, it is detected whether a display unit of at least one external device is present within the view angle region and wherein if the display unit of the at least one external device is detected within the view angle region, the first content is output to the display unit of the corresponding external device.

24. The HMD of claim 13, wherein the location state comprises a third state in which the display unit of the digital device is located within a view angle region of a user wearing the HMD and a fourth state in which the display unit of the digital device is not located within the view angle region of a user wearing the HMD.

* * * * *